United States Patent [19]

Shannon

[11] Patent Number: 4,577,278
[45] Date of Patent: Mar. 18, 1986

[54] METHOD AND SYSTEM FOR CONTROLLING A SELECTED ZONE IN A FUEL FIRED FURNACE

[75] Inventor: Robert A. Shannon, Avon Lake, Ohio

[73] Assignee: North American Manufacturing Company, Cleveland, Ohio

[21] Appl. No.: 514,921

[22] Filed: Jul. 18, 1983

[51] Int. Cl.$^4$ ............................................. F27D 3/00
[52] U.S. Cl. ................................... 364/477; 432/11; 432/18; 432/37; 432/54; 266/80
[58] Field of Search ....................... 432/11, 12, 36, 37, 432/18, 45, 49, 54; 266/78, 80, 87, 99; 239/416.4; 364/472, 557, 469, 506, 477

[56] References Cited

U.S. PATENT DOCUMENTS

| | | | |
|---|---|---|---|
| 3,236,460 | 2/1966 | Wood et al. | 239/416.4 |
| 3,548,171 | 12/1970 | Kodz | 432/11 X |
| 3,604,695 | 9/1971 | Steeper | 432/11 |
| 4,004,138 | 1/1977 | Morooka et al. | 266/80 X |
| 4,223,385 | 9/1980 | Miller et al. | 364/477 X |
| 4,255,133 | 3/1981 | Tanifuji et al. | 432/36 X |
| 4,338,077 | 7/1982 | Shibayama et al. | 432/11 X |
| 4,357,135 | 11/1982 | Wilde et al. | 432/11 |
| 4,373,364 | 2/1983 | Tanimoto e al. | 364/477 X |

Primary Examiner—Jerry Smith
Assistant Examiner—Allen MacDonald
Attorney, Agent, or Firm—Body, Vickers & Daniels

[57] ABSTRACT

A method and system is provided for controlling a selected zone in a fuel fired furnace of the type used for heating work as it moves through the zone from an entrant end to an exit end. The method and system includes providing a fuel fired burner at the exit end for propelling a flame toward the entrant end of the zone, controlling the firing rate or capacity of this flame in accordance with the temperature of the work adjacent the exit end of the zone, continuously establishing a gas temperature for the entrant end of the zone corresponding to the firing rate of the flame and then continuously controlling the length of the flame to obtain the established gas temperature at the entrant end of the zone. The combined adjustment of capacity and flame length in accordance with the measured temperature at the entrant end of the zone controls the heating profile through the zone and increases the efficiency of the heating zone. This method and system can be used in one or more zones of a multiple zone throughput gas fired furnace.

26 Claims, 12 Drawing Figures

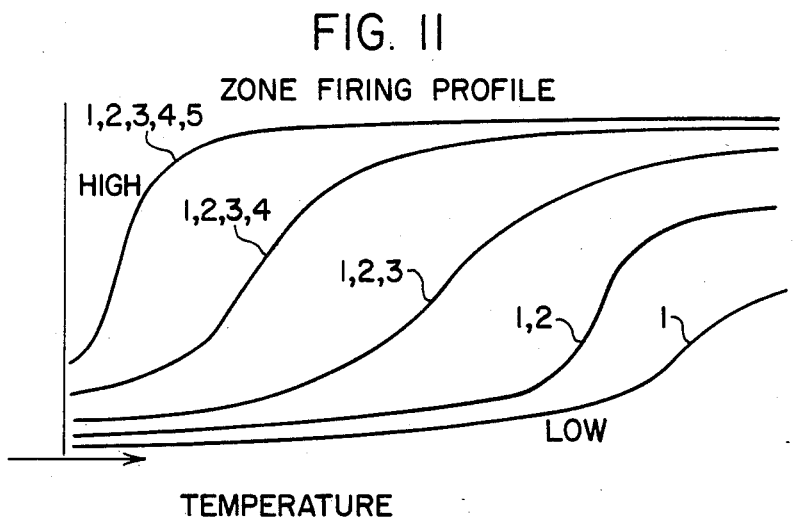

METHOD AND SYSTEM FOR CONTROLLING A SELECTED ZONE IN A FUEL FIRED FURNACE

DISCLOSURE

The invention relates to the art of controlling the heating in a throughput industrial type furnace and more particularly to a method and system for controlling the heating profile in a selected zone of a furnace in a manner to adjust the profile in relationship to the throughput or production rate to conserve energy by increasing the efficiency of the control heating zone.

INCORPORATION BY REFERENCE

The present invention can be employed with a furnace having the measuring arrangements and control features disclosed in prior U.S. Pat. No. 4,357,135. This patent is incorporated by reference to disclose the type of controlling components employed in the present invention. A burner for a gas or oil fired furnace of the type contemplated by the present invention includes an adjusting mechanism for changing the length of the flame issuing from the gas or oil fired burner without substantially changing the total heating capacity of the burner. In this manner, the burner capacity can be adjusted independently of the issuing flame length and vice versa. This particular burner is shown in U.S. Pat. No. 3,236,460 which relates to an arrangement for adjusting the length of the flame issuing from a fuel fired burner without substantially modifying the heating capacity of the burner. Prior U.S. Pat. No. 3,236,460 is incorporated by reference in this application as disclosure of one type of gas or oil fired burner which can be used in the preferred embodiment of the present invention. Of course, other burners having control mechanism for adjusting the flame without substantially changing the heating capacity of the burner could be employed in practicing the present invention.

BACKGROUND OF INVENTION

The present invention is particularly applicable for heating steel as it progresses through a multiple zone heating furnace of the type having a preheat zone, a heating zone and a soaking zone with the products of combustion passing in a counterflow direction from the soaking zone to the entrant end of the furnace for discharge through a standard flue and it will be described in relationship to such use; however, the invention has broader applications and may be used with other materials in various throughput, fuel fired furnaces. A representative furnace arrangement is illustrated in prior U.S. Pat. No. 4,357,135. That patent relates to the concept of controlling the firing capacity in the preheat zone as a function of the firing capacity in the heat zone and the flue gas exit temperature. Such a control system has substantially increased the efficiency of reheating furnaces by decreasing the temperature of products of combustion flowing through the flue to the recuperator of the furnace. This efficiency is obtained by controlling the preheat firing in conformity with the actual production sensed by the firing rate of the burner or burners in the heating zone. Although such control is a substantial improvement in the operation of heating furnaces for steel and other metals, there is still substantial difficulty resulting from drastic changes in the production rate of the work flowing through the furnaces. Indeed, when the furnace experiences a delay, drastic changes in the heating operation of the furnace take place which require immediate, experienced intervention by furnace operators. This control by the operators is through adjusting the capacity of the various burners in each zone so that the workpieces will not overheat during a delay. Consequently, when the workpieces or work start progression through the furnace again, all the burners are out of equilibrium and require further attention by the operator. To alleviate this difficulty, experienced operators attempt to anticipate the movement of the workpieces through each zone of the furnace which result in a substantial increase in the heat energy carried by the products of combustion through the flue of the furnace even when controlled in accordance with prior U.S. Pat. No. 4,357,135.

When heating steel in a three zone furnace, there are manual control devices for each of the three zones. In practice, the heating zone is set to operate in a temperature range of approximately 2300° F. to 2400° F. This produces work to the soaking zone which is maintained generally in the range of 2350° F. to 2400° F. As long as the furnace is operated according to the expected production, controlling the individual zones in accordance with a preset temperature allows generally satisfactory results; however, the production rate through such furnaces can vary drastically. Indeed, a complete workpiece or work delay can occur. When the production rate is decreased, the temperature profile in each of the heating zones is changed. The temperature at the entrant end of the zone increases as a general function of the decrease in the production rate. If there is a delay, this entrant end temperature drastically increases. Thus, gas issuing from each zone has a higher temperature than would be experienced during normal operation of the furnace. When the production rate increases, the temperature profile longitudinally through each of the zones changes in the opposite direction. The temperature at the entrant end of the zone drops. This reduces the temperature of the products of combustion passing from the zone and thus results in an increased efficiency since the energy is being applied to the work and not passing directly through the zone. When the production rate is further increased, the zones may not be able to produce a desired temperature of the work for use of the work in the subsequent processing. These drastic changes in the profile of temperature from the exit end of the heating zones to the entrant end of the heating zones has required substantial and experienced operator intervention. Basically, the operators have attempted to determine an optimum production rate. Then the operator attempted to maintain this rate so that the burners in the individual zones did not have to be substantially adjusted. This manual arrangement, together with the control feature previously described in U.S. Pat. No. 4,357,135, has been successfully employed. However, fixing the rate of flow through the furnace is not a final solution to the efficiency problem. There is still a substantial need for operator intervention. The net result of this situation is decrease in efficiency because the operators maintain the zones hot enough to assure that the workpieces entering the soaking zone are at the desired temperature. Otherwise, the workpieces must be reprocessed, which drastically decreases the efficiency of the overall production facility. Another arrangement devised by operators for solving the control problem of a furnace designed to progressively heat steel has been to intermittently move the work through the various zones. In this manner, each zone is used as a batch heating zone; however, the loss of heat energy through the flue by this arrangement is often well over 50% of the energy. It has been known that the capacity of the burners in each zone could be manually operated to compensate for changes in production rate to increase the efficiency of the furnace as the workpiece is continuously moved through the furnace. However, there was no arrangement that was satisfactory to provide continuous and accurate control of each zone so that the overall heating efficiency of a multi-zone, fuel fired furnace could be increased for the purpose of saving fuel, which has drastically increased in market value.

Even when the individual zones were attentively adjusted by operators to compensate for supposed changes in production rate, two specific problems occurred. First, the operator could not envision actual changes in production rate within the zone itself. Control adjustments could be made only on actual stoppage of the work. When that happened, drastic changes in heating capacity of the burners were made. The burners were turned down. This did not generally control the heating profile from the entrant end of the zone to the exit end of the zone. The profile would generally equalize at some condition during stoppage. When the work continued on through the furnace, the operator would adjust the burners to a higher capacity, which may or may not be proper. As can be seen, such manual intervention in a fuel fired furnace could not be maintained over long periods and with unsupervised furnace operations. Consequently, even when training programs were established to change heating capacity of the furnace zones with drastic changes in production rate, such training did not provide a long term solution to optimizing the efficiency of the furnace.

THE INVENTION

The present invention relates to a method and system for controlling each zone of a multi-zone heating furnace in a manner to overcome all the difficulties experienced in prior attempts to employ operators and/or control systems for this purpose. This method and system for controlling the zone of the furnace can be used in connection with the system shown in prior U.S. Pat. No. 4,357,135 and with other specific controls at various locations in the furnace. In accordance with a somewhat general aspect of the present invention, there is provided a method and system for heating a selected, elongated zone in a multi-zone reheating furnace in response to parameters in the selected zone itself. This method and system includes sensing a temperature in the zone controlled by the current throughput rate of work through the heating zone and controlling the heating pattern or profile between the entrant end of the zone and exit end of the zone to change the effective heating length of the zone as a function of the current throughput rate for the work. In accordance with this very broad aspect of the present invention, the heating profile or pattern is the temperature gradient from the exit end of the zone to the entrant end of the zone. This profile is basically a function of the difference between the temperature at the exit end and the temperature at the entrant end. For high efficiency, these two temperatures should be substantially different at the design throughput rate for the furnace. In accordance with the present invention, such temperature profile is controlled in accordance with a selected temperature being sensed, or measured, in the zone being maintained. In the preferred embodiment of the invention, this temperature is sensed, or measured, adJacent the entrant end of the zone. In accordance with this broad aspect of the present invention, as the temperature at the entrant end of the zone increases, as could be caused by a reduction in the production rate, the heating profile of the zone is decreased. In accordance with the preferred embodiment of the invention, this decrease in the effective length of the heating zone, or in the temperature profile, is caused by reducing the length of a flame, or flames, issuing or being propelled from a burner at the exit end of the zone being monitored toward the entrant end of the zone. Thus, as the entrant temperature of the zone increases, the length of the flame decreases. This concept has never been used in automatically controlling temperature in a zone of a multi-zone furnace. In accordance with another aspect of the present invention, the capacity of the burner, burners, or burner means at the exit end of the zone is controlled by the temperature of the workpiece or work at the exit end of the zone. Thus, the capacity or firing rate of the burner or burners adjacent the exit end of the zone being monitored is indicative of the work temperature at the exit end of the zone. At this temperature increases, the firing capacity of the burner, or burners, is reduced.

In accordance with another aspect of the invention, this firing capacity or firing rate of the burner means is used in a standard type function generator to provide the relationship between the entrant end temperature and how that temperature monitors or controls the heat profile in the zone by, in the preferred embodiment, changing the length of the flame or flames being propelled toward the entrant end of the zone. Thus, as a more specific aspect of the present invention, the firing rate of the burner, or burners, at the exit end of the zone being monitored is used to select the set point temperature which is employed in conjunction with the temperature at the entrant end of the zone to control the flame length in the monitored zone. These two features act in combination with each other to dramatically acknowledge and respond to minor changes in production, or furnace throughput, rate in the zone being monitored. Indeed, in accordance with still another aspect of the present invention, the change in temperature at the entrant end of the zone, with respect to time, can be monitored so that the change in the profile or effective length of the heating zone can be slowed down as a factor of the sensed rate of temperature change. This aspect provides a fast response to changes in furnace parameters, but a somewhat modulated or attenuated response. In accordance with the preferred embodiment, the change in capacity of the burner means at the exit end of the zone being monitored, together with a change in the effective length or heating profile through the zone, is continuously modulated or adjusted until an equilibrium temperature profile has been reached. This equilibrium profile will provide the proper temperature of the work as it exits the zone being monitored in accordance with the present invention. The "heating pattern," "heat profile," or "temperature profile," of a furnace zone can be controlled by the length of the flame of a burner, or burners, at the exit end of the monitored zone. In this manner, the point of maximum energy liberation of a particular flame can be changed from a position adjacent the exit end of the zone to a position adjacent the entrant end of the zone. This same result can be accomplished by employing a plurality of burners at the exit end of the zone and turning off the burners in sequence to reduce the heat profile, as well as heating capacity. Another arrangement for changing the profile is to provide a series of burners at the side of the zone extending from a position adjacent the exit end of the zone to a position adjacent or closer to the entrant end of the zone. As the temperature profile is to be shortened, the burners toward the entrant end of the zone are turned off in sequence. In this manner, the effective heating length or profile of the zone is modulated. The same type of arrangement could be provided by rows of roof type burners which can be turned off in sequence to effectively change the length of the heating portion of the zone being monitored. As so far described, the invention for monitoring the heat in a particular zone has been indicated to be a single system. It is appreciated that, in some furnaces, there may be burners both on the top and bottom of the zone being monitored. In this instance, the bottom and top control arrangements are controlled in parallel to accomplish the invention as defined above.

In accordance with the operation of the present invention, the temperature profile of each zone of a furnace is adjusted by adjusting the effective length of the zone. This can be done by moving the point of maximum energy liberation from the burner flame or flames. When production rate through the zone is reduced, the point of maximum energy liberation is drawn as close to the burner end as possible. When production is high, this maximum point of energy liberation from the flame is moved away from the burner wall toward the entrant end of the zone. This change in the length of the flame is accomplished without changing the capacity or firing rate of the flame by moving a device or mechanism in the burner itself to increase and decrease the length of the flame, as shown in U.S. Pat. No. 3,236,460. In accordance with the preferred embodiment, a thermocouple is placed at the entrant end of the zone being monitored to measure the temperature of the product's combustion exiting from the zone. This is the parameter controlled in some direct manner by the temperature of the work entering the heating zone, and the production rate. The entrant temperature is compared to a set point from a function generator which is controlled in accordance with the firing rate of the burners as described in prior U.S. Pat. No. 4,357,135. Function generators can be analog or they can be provided in microprocessor systems, mini-computers or other digital control arrangements well known in the art. In this manner, a given firing rate, as measured by the operation of the individual burners of the zone being monitored, can be translated into a desired temperature at the entrant end of the zone to determine whether or not the profile of the zone should be increased or decreased. The particular function generator relationship is selected for each furnace; however, the slope or overall tilt of this relationship is known. As the firing rate increases, the set point temperature for controlling the temperature profile of the zone increases. Even a straight line and/or empirical relationship would be sufficient to provide benefits of the present invention. Additional benefits could be accomplished by modifying this particular relationship of the functioning generator in accordance with the desire of the furnace operator and/or furnace designer.

When using the present invention, as the production or throughput is reduced, temperature at the exit end of the zone increases. This results in a decrease in the firing rate in the zone, in accordance with normal practice and as specifically set forth in prior U.S. Pat. No. 4,357,135. The set point temperature for the entrant end is automatically reduced. This shortens the length of the burner flame which further increases the temperature at the exit end. Thus, there is a further decrease in the firing rate. These two interactions continue until there is an equilibrium between the firing rate and the flame length to produce the desired entrant end temperature. These interactions are quite rapid. In that regard, it is possible to employ a device for measuring the rate of change of temperature in the entrant end of the zone to slightly modify the speed at which the dual parameter equilibrium is obtained.

When the production rate increases, the temperature of the work at the exit end of the zone decreases. This immediately increases the firing rate to increase the set point temperature in the entrant end of the zone. This causes an increase in the length of the flame from the burners which further decreases the temperature at the exit end of the zone and increases the entrant temperature. Thus, the firing rate of the burners is further increased. This action again cycles until equilibrium is reached for a given increased production rate.

The primary object of the present invention is the provision of a method and system for controlling the burners of a particular zone in a fuel fired furnace for increasing the efficiency through the zone, as production rate or throughput changes.

Another obJect of the present invention is the provision of a system and method, as defined above, which system and method prevents the monitored zone from lagging behind the production changes in the furnace, even though this may involve work stoppage.

Still a further object of the present invention is the provision of a method and system for controlling the heating in a zone of a multi-zone fuel fired furnace, which method and system tracks the production rate through the zone by monitoring the production-rate at one or more locations within the zone.

Yet a further object of the present invention is the provision of a method and system for controlling the firing of a zone in a multi-zone furnace, which method and system allows the furnace to be operated at its maximum throughput capacity with a high efficiency maintained in each of the zones.

Still a further object of the present invention is the provision of a system and method for controlling the heating of a zone in a multi-zone furnace in a manner which will maintain an exit gas temperature necessary to heat the work without the requirement of maintaining a higher exit temperature, as is now generally done.

Another object of the present invention is the provision of a method and system for controlling the heating of a zone in a multi-zone furnace, which method and system employs modulation of the heating capacity and the temperature profile across the zone in response to the actual energy demands in the zone, as dictated by the work being heated.

Yet another object of the present invention is the provision of a method and system for controlling the heating in a zone of the furnace so that the zone can respond to a delay in the work flow without overheating the work or allowing the introduction of cool work into the zone upon restarting of the furnace.

A further object of the present invention is the provision of a method and system for controlling the heating profile across a zone in a multi-zone furnace in accordance with the heating capacity of the burner or burners in the zone. In accordance with this object, the entrant temperature of the work is generally employed for temperature profile control.

These and other objects and advantages will become apparent from the following description of the preferred embodiment of the invention.

PREFERRED EMBODIMENT OF THE PRESENT INVENTION

Figures 1, 1A:
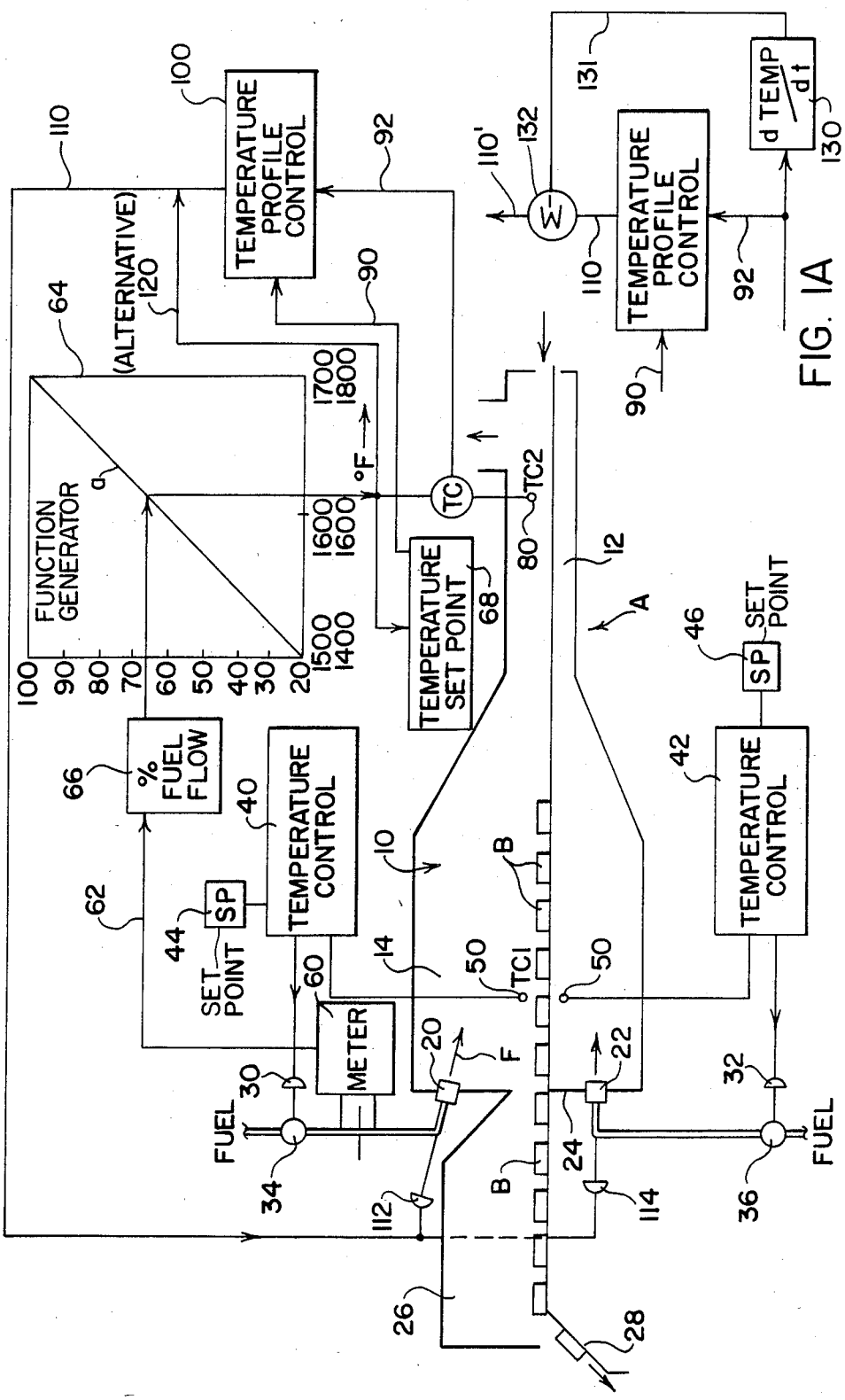
FIG. 1 is a schematic diagram illustrating the preferred embodiment of the present invention as employed in a single heating zone of a furnace.
FIG. 1A is a partial function diagram illustrating a slight modification of the preferred embodiment shown in FIG. 1.

Referring now to the drawings wherein the showings are for the purpose of illustrating a preferred embodiment of the invention only and not for the purpose of limiting same, FIG. 1 shows a reheating furnace A for heating work shown in the form of a plurality of spaced workpieces B formed, in the preferred embodiment, of steel and to be heated to a processing temperature at the exit end of the furnace A. In accordance with the illustrated embodiment, heating zone 10 includes an entrant end 12 and an exit end 14. Burner or burners 20, 22 are located at rear wall 24 located generally at the intersection between heating zone 10 and soaking zone 26, from which the workpieces or work B are discharged along ramp 28. The firing rate or capacity of the burners 20, 22 is controlled, in accordance with standard practice, by a device schematically illustrated as burner controls 30, 32. These devices are well known in the art and are shown specifically in prior U.S. Pat. No. 4,357,135. As these devices modulate fuel valves 34, 36, the capacity of burners 20, 22, respectively, is adjusted. Of course, there is corresponding adjustment in the air so that the desired relationship or ratio of air to fuel is maintained, irrespective of the capacity to which the burners are adjusted between a maximum and minimum capacity. In accordance with the illustrated embodiment, the capacity of the burners 20, 22 is controlled between maximum and minimum levels. This is well known in the art of fuel fired burners for use in industrial furnaces. The fuel can be natural gas, oil, coal slurry or other appropriate commercially available fuels. In the illustrated embodiment, natural gas is employed for providing the fuel through valves 34, 36 to burners 20, 22, respectively. Although a single burner is illustrated at the upper and lower portions of zone 10, a plurality of burners can be located at wall 24 in accordance with standard practice to control the desired heating capacity of zone 10.

The mechanism for conveying the work B through the furnace is well known in the art and may be a pusher arrangement, walking beams, or any other arrangement to satisfy the need for conveying the work or workpieces B in a continuous fashion through furnace A.

Linear controls 40, 42 are employed for adjusting the capacity or firing rates of burners 20, 22, respectively. The set point control arrangement for linear control devices 40, 42, is schematically illustrated as manually adjustable devices 44, 46. These allow a fixed set point temperature so that the capacity of the burner is adjusted with respect to the temperature sensed at exit end 14 of zone 10 by appropriately located thermocouples 50. Thus, as the temperature of the work at the exit end of zone 10 increases, flow through valves 34, 36 is decreased to reduce the firing rate or capacity of burners 20, 22. This is in accordance with standard practice and is well illustrated in prior U.S. Pat. No. 4,347,135. The capacity of burners 20, 22 is detected and continuously measured by fuel flow meter 60 which is used to control the corresponding amount of air and is also used to provide a level signal in line 62. This signal is representative of the percentage of fuel flow in burner or burners 20 at the upper portion of heating zone 10. Of course, a similar control arrangement could be employed at the lower portion of zone 10 to control the operation of burners 22. The description of the operation of burners 20 will apply equally to the burners 22 and is not here repeated. A standard function generator 64 having general mathematical characteristics shown as curve a in FIG. 1, is employed for changing the temperature set point at output 68 in accordance with the percentage of fuel flow at the input 66. As the percentage of fuel flow or capacity increases, the set point temperature is increased. When employed for steel, the temperature relationship illustrated in FIG. 1 applies. At about 65% of capacity for burner 20, a temperature of about 1650° is the set point adjusted at output 68. Of course, curve a may be slightly modified and still maintain a direct relationship as illustrated in FIG. 1. As thermocouple 50 senses temperature lower than the set point determined by control 44, burners 20 are adjusted to have an increased firing rate or capacity. This is measured as percentage of fuel in line 62. When this occurs, the set point at the output of function generator 64 is increased. This causes a thermocouple 80 at entrant end 12 of zone 10 to seek a higher set point temperature so that the temperature profile across the zone is tilted upwardly to increase the set point temperature of thermocouple 80 as compared to the fixed set point temperature of thermocouple 50. This second temperature is TC2 and continues to rotate around the control temperature at thermocouple 50 in an upward direction, in accordance with the demands placed upon burner 20. This change in relationship between set points TC1 and TC2 will occur because of increased burner capacity. Thus, as production rate increases, the set point for TC2 increases because there is a greater demand for the heating capacity of burner 20 as sensed and detected by meter 60.

The set point line 90 for TC2 is directed to a temperature profile control 100 as is the actual temperature in line 92 from thermocouple 80. There is a comparison made by temperature profile control 100. This comparison will indicate whether or not the temperature profile in zone 10 is such to obtain the desired temperature at TC2 measured by thermocouple 80. If the profile is not correct, there is an indication from the comparator or profile control 100 that the set point temperature profile of zone 10 must be increased. The comparison in control 100 creates an appropriate flame length adjusting signal in line 110 which is directed to the flame length adjusting mechanism 112 of burner 20. This can be a movable baffle to change the air turbulence or spin of the air from the burner 20 or another arrangement which will modulate and control the effective length of the flame F issuing from burner or burners 20. By increasing the length of the flame F, more heat is directed through the furnace for entrant end 12. This increases the temperature TC2 as sensed by thermocouple 80. This continues until the set point has been reached as determined by function generator 64 at output 68. If comparator circuit or temperature profile control 100 senses that the TC2 temperature is greater than the set point temperature from function generator 64, then the signal in line 110 has the opposite sign or direction and reduces the length of flame F by the appropriate control 112. Thus, the signal in line 110 determines whether or not the length of flame F will be lengthened or shortened in accordance with the relationship of the temperature sensed by thermocouple 80 with respect to the desired relationship or the set point in line 68, as controlled by function generator 64 in accordance with the burner capacity or firing rate at the input 66. The signal in line 110 is also directed toward mechanism 114 for adjusting the length of the flame from lower burners 22. Of course, separate controls could be employed for this purpose.

In operation, temperature TC1, as sensed by thermocouple 50, and TC2, as sensed by thermocouple 80, are in equilibrium so that the firing capacity of the burners and the length of the flame to control the temperature profile in zone 10 are fixed according to the desired amount of energy being directed to the workpiece B as they move through the zone 10 of furnace A. Assume now that the production rate or throughput is decreased. The temperature at TC1 will tend to increase. This will decrease the fuel flow, capacity or firing rate of burners 20 and 22. When this occurs, the set point at output 68 of function generator 64 is decreased. Consequently, the temperature at entrant 12 is greater than the set point. This will cause a flame length decreasing signal in line 110 from control or comparator 100. Thus, the flame from burners 20, 22 will be shortened in length. This tends to reduce the temperature at entrant end 12 as sensed by thermocouple 80; however, it also tends to increase the temperature at TC1. This causes a further decrease in the fuel flow rate which further decreases the set point temperature output 68 of function generator 64. This process of reducing the flame length and capacity of burners 20, 22 continues at a rapid rate until there is equilibrium wherein the temperature at TC1 is the desired set point temperature as determined by manual controls 44, 46. This will be with the flame quite short if the production rate is reduced such as caused by a stoppage or delay of movement of the work B. The temperature of the work at exit end 14 will be controlled according to the desired temperature for the work as it is to be introduced directly into the soaking zone 26. This is a desirable characteristic. In addition, the profile through zone 10 is reduced so that there is only heat adjacent the exit end. In other words, the profile has been shifted so that the set point temperature in output 68 is relatively low. This would be at a minimum if there is actual stoppage or a delay of work passing through the zone. The same action will occur at any reduced production or throughput rate for the work. As can be seen, burner 20 will have its capacity and flame characteristic changed to an equilibrium condition determined by the actual production rate or throughput of work B for zone 10. Assume that the flow rate increases after a delay or reduction in production capacity. When this occurs, the temperature TC2 will be lower than its set point. Consequently, a signal in line 110 will tend to increase the flame length from burners 20, 22. When this occurs, the temperature TC2 tends to go down which causes an increase in the capacity required by the burners. Thus, valves 34, 36 are increased to increase the burner's capacity or firing role. When this happens, the set point at line 68 is increased. This continues until there is again equilibrium between the heating capacity or firing rate of burners 20, 22 and the length of flame F from burner 20. This is the preferred embodiment of the present invention and employs a dual type of control for the heating zone with both capacity and the heating profile along the zone being controlled for the purposes of reaching an equilibrium between two spaced temperatures TC1 and TC2. A modification of the preferred embodiment is shown also in FIG. 1 wherein an emperical line 120 can bypass temperature profile control 100. In this fashion, flame length F is controlled directly in accordance with the firing rate, fuel flow or capacity at the input 66 of function generator 64. The output 68 is directed as a signal in line 120, to emperically adjust the mechanisms 112, 114 for the purposes of correlating the heating profile with the demand on the burners as sensed by thermocouple 50. This emperical relationship estimates the TC2 temperature for controlling the furnace zone. This control, although utilizing both temperature profile and capacity, does not have the trimming effect which is obtained in the preferred embodiment by employing an actual thermocouple 80.

FIG. 1A shows a further modification of the preferred embodiment. In this modification, a circuit 130 provides a signal having a magnitude caused by differentiation of temperature with respect to time. Thus, the rate at which the temperature at TC2 increases is created as a magnitude signal in line 131, which signal is directed to the negative terminal of a summing circuit 132. Consequently, the rate at which the flame is decreased or increased is slowed down by the subtractive effect of the signal in line 131. This allows a controlled rate of tracking between the flame length and the change in temperature as sensed by thermocouple 80. Of course, it can be modulated according to the desired rate of adjustment for burners 20, 22. The introductory portion of the specification is incorporated by reference herein as a description of the preferred embodiment of the present invention which will not be repeated.

Figure 3:
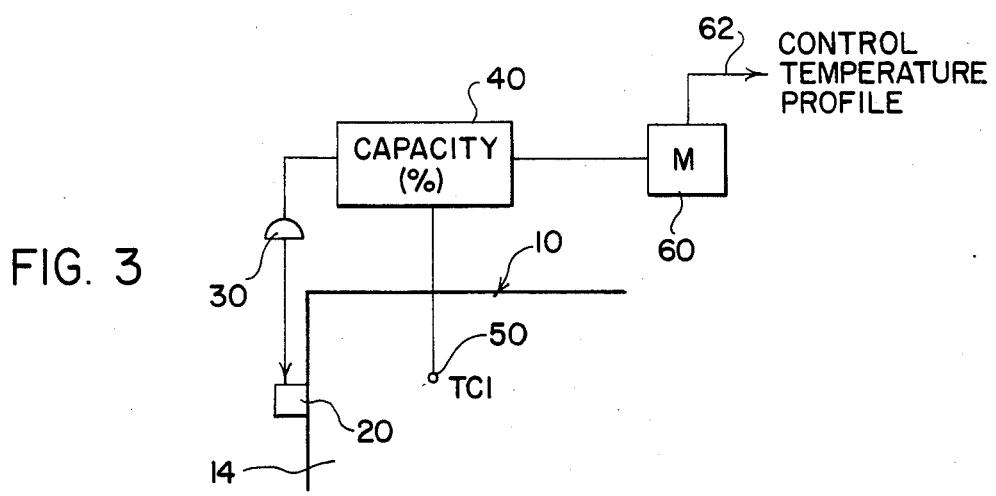
FIG. 3 is a partial schematic diagram of one aspect of the preferred embodiment of the present invention as shown in FIGS. 1 and 2.
Figure 4:
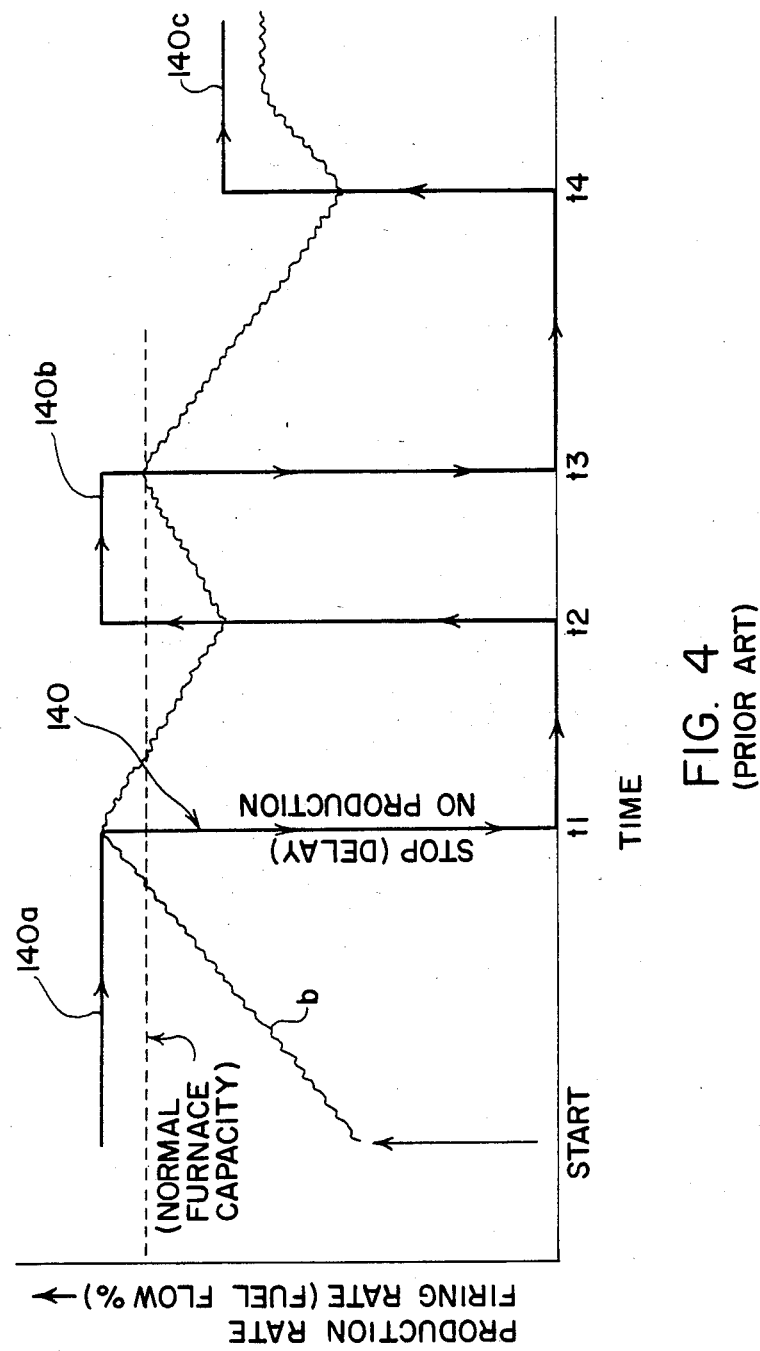
FIG. 4 is a graph illustrating production rate and firing rate for a furnace zone not employing the preferred embodiment of the present invention.
Figure 5:
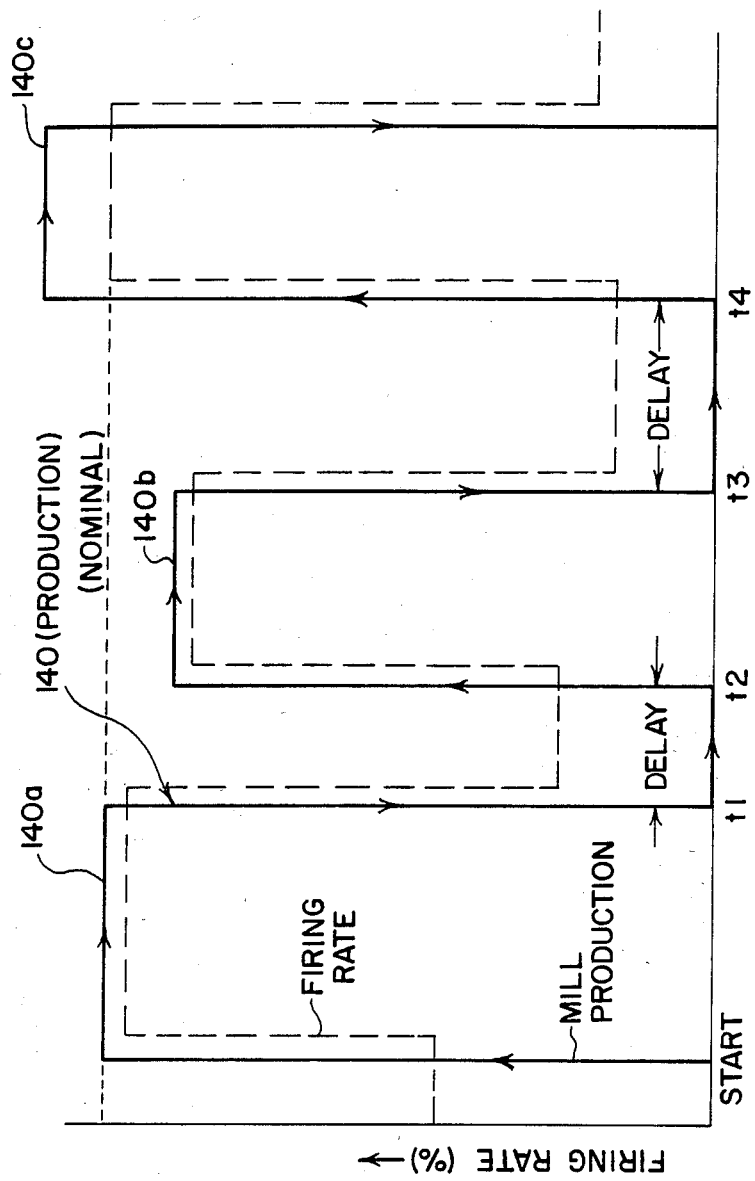
FIG. 5 uses a graph similar to FIG. 4 showing a furnace zone employing the present invention.

Referring now to FIG. 3, this is a schematic representation of a relatively broad aspect of the invention wherein the signal in line 62, which is indicative of the adjusted fuel flow rate or capacity by temperature control mechanism 40 and thermocouple 50, is used to adjust the heating profile in zone 10. This can be done in conjunction with the actual temperature, as sensed by thermocouple 80, or emperically, as indicated by the line 120 in FIG. 1. The operating characteristics as previously mentioned are shown in FIGS. 4 and 5. In FIG. 4, furnace A is operated without the present invention. The production rate is illustrated as line 140 which is above the normal rate at the start of the furnace which is indicated by horizontal line 140a. At time t1, there is a work stoppage. Thus, the production rate is reduced to zero. At time t2 the production rate is increased to the level as indicated at portion 140b of line 140. At time t3 the production rate is again stopped. And at time t4 the production rate goes up to a value different than the normal capacity of the furnace. This is represented by horizontal portion 140c. The firing rate for burners 20, 22, without use of the present invention, generally rises from a low amount to a high amount during portion 140a. See curve b. When the production rate drops off, the firing rate for the burners gradually drifts down until time t2. Thereafter, the burners gradually increase until time t3 and then decrease until time t4. As can be seen, the burners are at a relatively high firing rate when the production is stopped between times t1, t2, and times t3 and t4. By employing the present invention, the firing rate as indicated by line 150 in FIG. 5 generally tracks the production rate so that integration of the area below line 150 in FIG. 5 is generally the energy consumed and is substantially less than the same area below the firing rate curve b, as shown in FIG. 4 for a system not employing the present invention.

Figure 2:
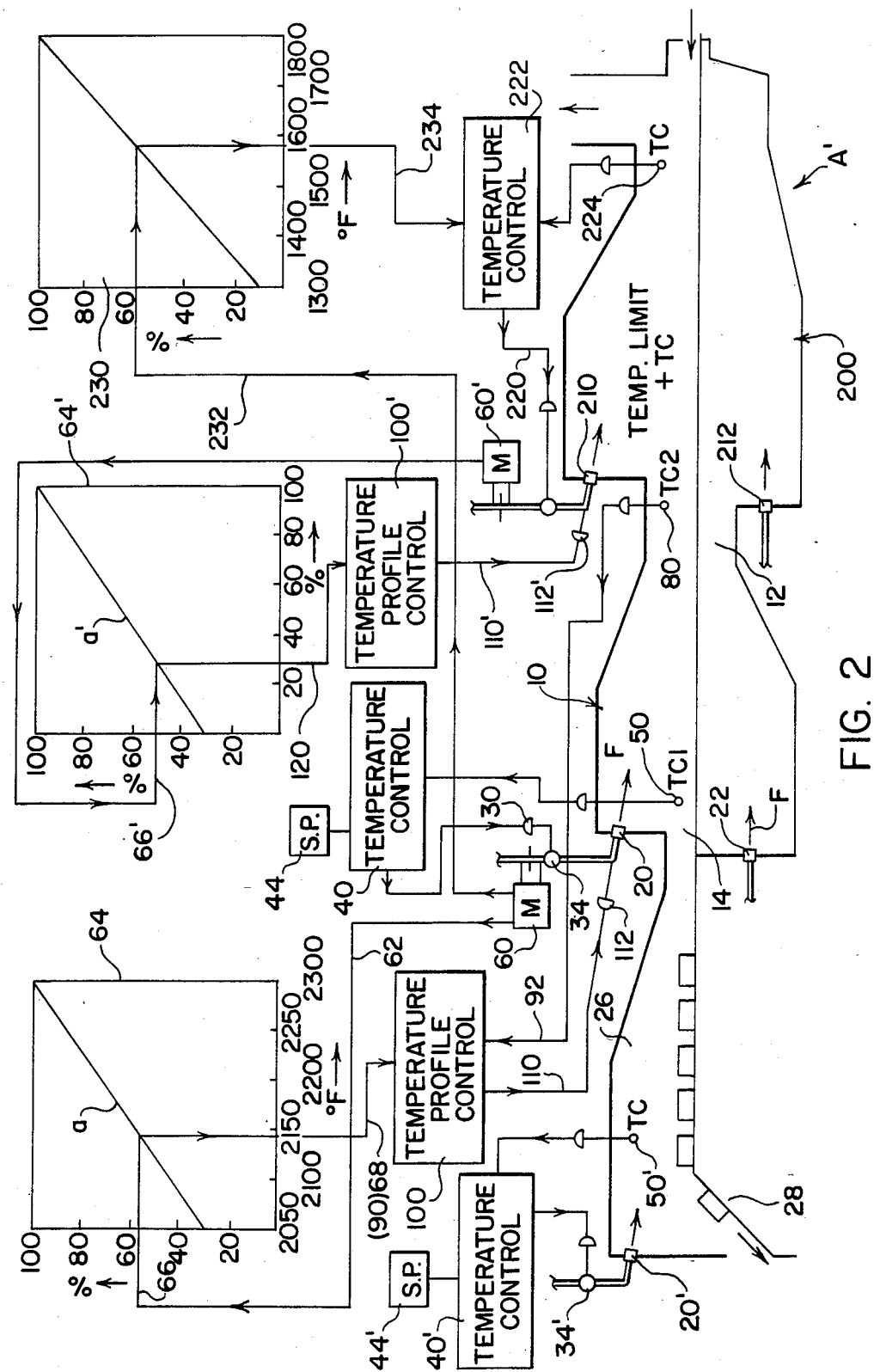
FIG. 2 is a schematic diagram illustrating the present invention as employed in a multi-zone furnace and also employing the invention defined in prior U.S. Pat. No. 4,357,135, together with other controls for the multi-zone furnace.

Referring now to FIG. 2, a total multi-zone furnace employing both the preferred embodiment of the present invention and the control mechanism specifically described in prior U.S. Pat. No. 4,357,135 is disclosed. Zone 10 operates in accordance with the previous description and contains components, as previously described bearing the same numbers. Preheat zone 200 includes burners 210, 212. Of course, a number of burners could be employed at the top and bottom of the preheat zone. As described in the prior patent, a control signal in line 220 is generated by a comparator device 222 which compares the temperature of the flue gas, as measured by thermocouple 224, together with the output of a function generator 230. This generator has an input 232 controlled by the firing capacity or fuel flow rate as measured by device 60. Output 234 of function generator 230, as described in the prior patent, controls comparator device 222. This creates a signal in line 220 that controls the capacity of burners 210, 212. This control is effected in accordance with a modification of the preferred embodiment of the invention wherein flame length F is controlled emperically by function generator 64'. The output 66' is the emperical line 120 shown in FIG. 1. This controls the signal in line 110' to adjust burner 210 in the direction determined by the percentage set forth in the lower portion of function generator 64'. The input of function generator 64' is controlled by metering device 60' that detects and conveys the capacity of burner 210. As can be seen, the length of the flames of burners 210, 212 is controlled in accordance with a flame length percentage having a relationship with heating capacity determined by line a' of function generator 64'. This can be adjusted emperically to obtain the desired results. So far the heating zone has been controlled by adjusting the temperature profile in accordance with the present invention and employing thermocouple 80. Preheating zone 200 is controlled in accordance with the invention of prior U.S. Pat. No. 4,357,135 in conjunction with a modification of the preferred embodiment of the invention employing an emperical output in line 120. Soaking zone 26 is controlled in accordance with standard practice wherein the temperature is sensed by thermocouple 50' to control the fuel flow through valve 34' to control only the capacity of burner 20'. This allows the soaking zone 26 to be controlled in accordance with the prior art. Of course, various other heating zones could be employed. They would utilize the invention as employed in zone 10 of furnace A', shown in FIG. 2. This furnace is illustrated to show the relationship between the prior art control used in soaking zone 26, the prior art employed in the preheat zone 200, and the present invention as employed in the heating zone 10 and the preheat zone 200.

Figure 6:
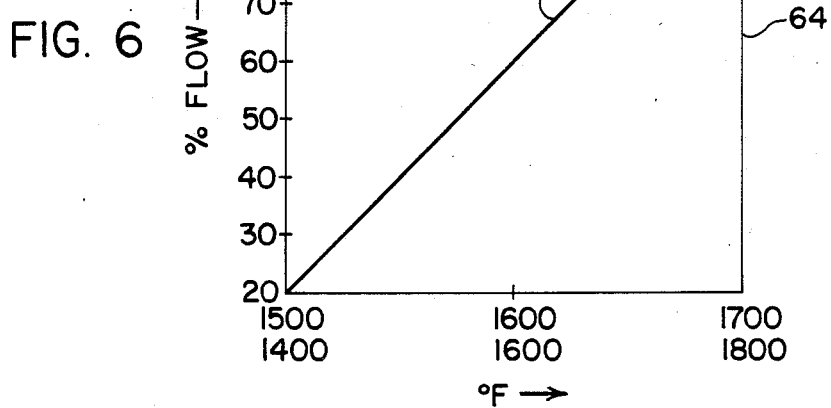
FIG. 6 is a graph illustrating the general relationship between the firing rate or capacity of the burner or burners in the monitored zone and its effect upon the set point or emperical relationship of the entrant temperature as created by a function generator.
Figure 7:
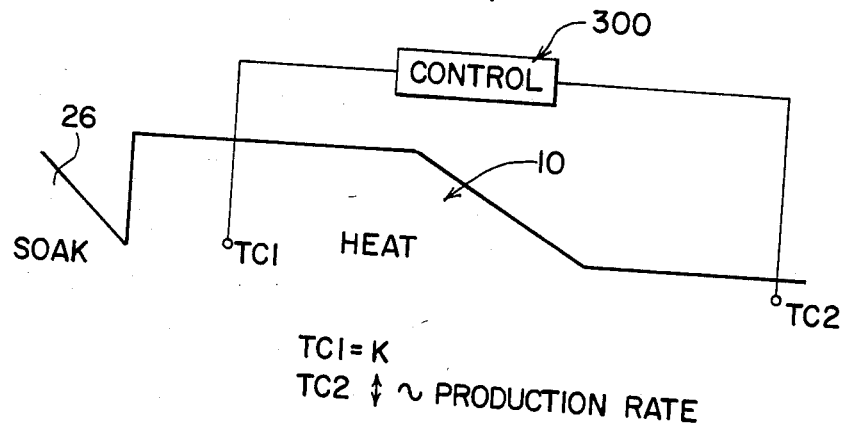
FIG. 7 is a schematic diagram illustrating the relationship of the entrant and exit temperatures in a zone being monitored in accordance with the present invention.
Figure 8:
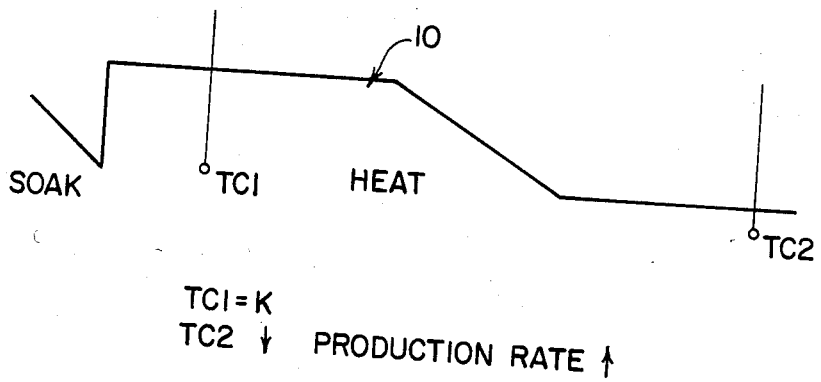
FIG. 8 is a view similar to FIG. 7 illustrating the operating characteristics of a zone not employing the present invention.

Referring now to FIG. 6, this figure is employed only to schematically illustrate the relationship between the fuel flow rate and the set point 68 or the emperical output 68'. FIGS. 7 and 8 are set forth for the purpose of discussing a feature obtainable by using the present invention. The control 300 shown in FIG. 7 for zone 10 employs a relationship between temperatures TC1 and TC2. Since the work should have a temperature K as it enters the soaking zone 26, the temperature TC1 is generally constant. In accordance with the present invention, the temperature TC2 adjusts upward and downward to change the temperature profile between these two thermocouples in accordance with the invention. As the production rate increases, TC2 approaches temperature K. As the production rate decreases, TC2 tilts downwardly from temperature K. It is apparent that such an arrangement obtains the desired control over heating zone 10 automatically without operator intervention and in accordance with the desired results. This is apparent from the arrangement schematically illustrated in FIG. 8. Again, TC1 remains constant at temperature K. However, TC2 decreases as the production increases. This is the problem presented by the prior art. Temperature TC2 decreases as production increases. In a like manner, when production decreases, TC2 increases. This is the normal operation of a heating zone 10 and is completely inverted by the method and system contemplated in the present invention. Although TC2 is shown in FIG. 8, the temperature is not sensed in the prior art but its fluctuation is known and conforms with the general relationship shown in FIG. 8.

Figure 9:
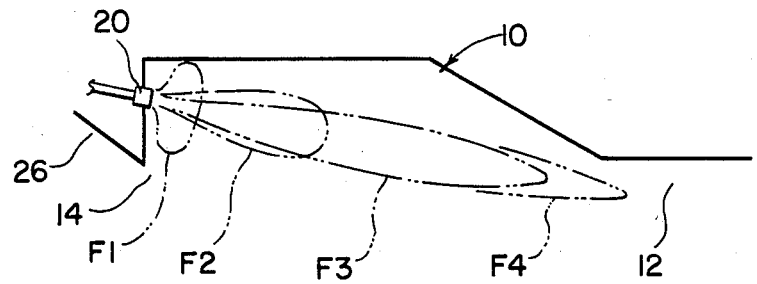
FIG. 9 is a schematic view illustrating adjustment of the temperature profile by changing the length of a flame issuing from the burner or burners of a zone constructed in accordance with the present invention.
Figure 9:
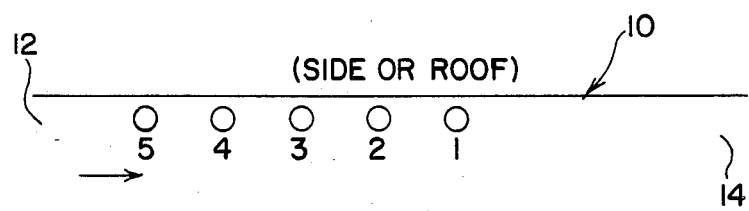
Figure 10:
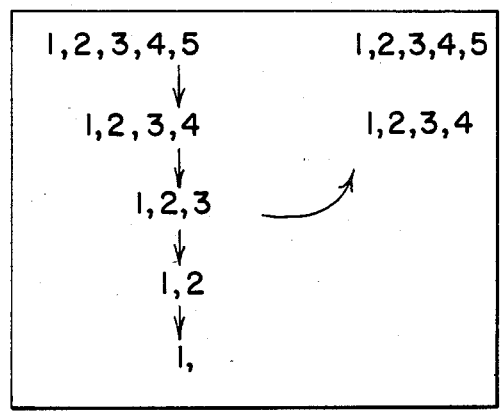
FIG. 10 is a modification of the burner means used in the preferred embodiment wherein rows of side or roof burners control the heating profile between the entrant and exit end of a zone monitored in accordance with the present invention; and, FIG. 11 is a graph showing changes in the temperature profile employing the burner arrangement shown in FIG. 10.

FIG. 9 shows how the flames F1–F4 change the heating profile of zone 10 from burner 20 toward the entrant end 12 of zone 10. Burner 20 can have its flame adjusted between length F1 to length F4 as the heating capacity remains generally constant. The invention relates to the concept of controlling the temperature profile and capacity of a given zone by measuring a parameter, such as the entrant temperature in the zone. The heating profile through the zone is changed in the preferred embodiment by adjusting the length of flame F as the burner capacity remains constant. The same change in temperature profile in controlled zone 10 is schematically illustrated in FIG. 10. A number of side or roof burners labelled Nos. 1, 2, 3, 4 and 5 are spaced along zone 10 from exit end 14 toward entrant end 12. With all burners operating, zone 10 has a heating profile wherein TC2 approaches TC1. To change this profile, the burner or burners No. 5 can be turned off. This would provide an equivalent to a shortened flame from burner 20, as shown in FIG. 9. If burner or burners No. 4 are turned off, the flame is shortened further. This provides a profile generally determined by burners Nos. 1, 2 and 3. The increase and decrease of the temperature profile in zone 10 by changing the arrangement of burners is schematically illustrated in FIG. 10 and set forth in the numbering arrangement at the lower portion of this figure. This profile concept is also shown by the graphs in FIG. 11 wherein the effective length of the zone is increased by changing the number of burners as illustrated in FIG. 10 or the flame lengths as illustrated in FIG. 9. Of course, other arrangements for changing the temperature profile in zone 10 could be employed.

Having thus described the invention, the following is claimed:

1. A method of heating a selected zone in a fuel fired furnace having means for moving work through said selected zone in a given direction from an entrant end to and through an exit end of said zone at a variable production rate, said furnace further having a means for controlling the heating rate in said zone and means for controlling the temperature profile in said zone and in a direction parallel to said given direction between a first short profile with the point of maximum energy liberation adjacent said exit end and a second long profile with said point of maximum energy liberation spaced from said exit end, said method comprising: controlling said heating rate in accordance with the exit temperature of said selected zone and adjacent to said exit end of said zone, establishing a desired set point temperature at said entrant end of said zone corresponding to said heating rate as controlled by said exit temperature, and inversely adjusting said temperature profile in response to deviation of the actual temperature at the entrant end of said zone from said set point temperature until said heating rate and temperature profile reach an equilibrium condition.

2. A furnace having a heating zone in an entrant end, an exit end and means for moving work through said zone from said entrant end to and through said exit end; burner means at said exit end of said zone for propelling a flame from said exit end torward said entrant end; means for controlling the firing rate of said burner means in direct proportion to temperature of said work at said exit end; and automatic means for controlling the length of said propelled flame in accordance with a relationship between said firing rate and the temperature of said work adjacent said entrant end of said zone.

3. A furnace as defined in claim 2 wherein said relationship is continuously generated by a means for increasing a set point temperature as said firing rate increases, means for comparing said set point with the temperature of said work as measured adjacent said entrant end and said flame length controlling means includes means for increasing the length of said flame when said measured temperature is less than said set point and for decreasing the length of said flame when said measured temperature is more than said set point.

4. A method of operating a furnace having a heating zone, an entrant end, and exit end and means for moving work through said zone from said entrant end to and through said exit end; said method comprising: propelling a flame from said exit end toward said entrant end; controlling the firing rate of said heating zone in direct proportion to temperature of said work at said exit end; and controlling the length of said propelled flame in accordance with a relationship between said firing rate and the temperature of said work adjacent said entrant end of said zone.

5. A method as defined in claim 4 including the further steps of continuously generating said relationship by increasing a set point temperature as said firing rate increases; comparing said set point with the temperature of said work as measured adjacent said entrant end; increasing the length of said flame when said measured temperature is less than said set point and decreasing the length of said flame when said measured temperature is more than said set point.

6. A method of heating a selected zone in a fuel fired furnace having means for moving work through said selected zone from an entrant end to and through the exit end of said zone at a variable production rate, said furnace further having a fuel fired burner means including at least one fuel fired burner at said exit end of said zone and control means for varying the length of said selected zone which is directly fired by a flame or flames from said fuel fired burner means between a first length with said direct fired portion of said zone being adjacent said exit end only and a second length with said direct fired portion of said zone being generally from said exit end of said zone to a position substantially spaced from said exit end in a direction toward said entrant end of said zone, said method comprising measuring temperature in said zone adjacent said entrant end as a function of the production rate of work through said zone, determining whether said measured entrant temperature is above or below a set point temperature and inversely adjusting said length of said direct fired portion in accordance with a preselected relationship.

7. A method as defined in claim 6 further including adjusting the firing rate of said fuel fired burners as an inverse function of a temperature sensed in said selected zone and controlling said preselected relationship as an inverse function of said firing rate.

8. A method as defined in claim 7 wherein said sensed temperature and said measured temperature are substantially the same and are obtained adjacent said entrant end of said zone.

9. A method as defined in claim 7 wherein said sensed temperature is adjacent said exit end of said selected zone.

10. A method as defined in claim 9 including adjusting the length of the flame from said fuel fired burner means for varying said direct fired portion of said selected zone.

11. A method as defined in claim 6 including adjusting the length of the flame from said fuel fired burner means for varying said direct fired portion of said selected zone.

12. A method of heating a selected zone in a fuel fired furnace having means for moving work through said zone from an entrant end to and through an exit end, said furnace having first adjustable means for controlling the firing rate in said zone and second adjustable means for varying the portion of said zone which is directly fired between a first condition with said direct fired portion of said zone being adjacent said exit end and a second condition with said direct fired portion of said zone being generally from said exit end to a position generally adjacent said entrant end, said method comprising the steps of:

(a) controlling said first adjustable means in accordance wtih a selected temperature in said zone; and, (b) simultaneously controlling said second adjustable means in accordance with the actual heating of said selected zone as sensed at least by the firing rate of said first adjustable means.

13. A method as defined in claim 12 including the step of controlling said second adjustable means in accordance with a relationship between said firing rate and said selected temperature in said zone.

14. A method as defined in claim 12 including the step of controlling said second adjustable means in accordance with an empirical relationship with only said firing rate.

15. A system for controlling the heating of a selected zone in a fuel fired furnace having means for moving work through said selected zone in a given direction from an entrant end to and through an exit end of said zone at a variable production rate, said furnace further having first means for controlling the heating rate in said zone and second means for controlling the temperature profile in said zone and in a direction parallel to said given direction between a first short profile with the point of maximum energy liberation adjacent said exit end and a second long profile with said point of maximum energy liberation spaced from said exit end, said system comprising: means for controlling said heating rate by said first means in accordance with the exit temperature of said selected zone and adjacent to said exit end of said zone; means for establishing a desired set point temperature at said entrant end of said zone corresponding to said heating rate as controlled by said exit temperature; and, means for inversely adjusting said temperature profile by said second means in response to deviation of the actual temperature at the entrant end of said zone from said set point temperature until said heating rate and temperature profile reach an equilibrium condition.

16. A control system as defined in claim 15 wherein said temperature profile second means includes means for adjusting the flame length of a fuel fired burner facing in a counter flow direction parallel to said given direction of said work.

17. A method of heating a selected zone in a fuel fired furnace for heating work as it moves through said zone from an entrant end to an exit end, said method comprising: providing a fuel fired burner at said exit end for propelling a flame toward said entrant end; controlling the firing rate or capacity of said flame in accordance with the temperature of said work adjacent said exit end of said zone; continuously establishing a gas temperature for said entrant end of said zone corresponding to said firing rate of the flame; and controlling the length of said flame to obtain the established gas temperature for said entrant end of said zone.

18. A method as defined in claim 17 wherein said flame length controlling step includes measuring the temperature of said zone at said entrant end; comparing said measured temperature at said entrant end with said established temperature; and, increasing said flame length if said measured temperature is less than said established temperature or decreasing said flame length if said measured temperature is greater than said established temperature.

19. A method as defined in claim 18 including the step of measuring the rate of change of said measured temperature at said entrant end as a function of time and decreasing the change of said flame length as a function of said measured rate.

20. A system for controlling the heating of a selected zone in a fuel fired furnace for heating work as it moves through said zone from an entrant end to an exit end, said system comprising: a fuel fired burner at said exit end for propelling a flame toward said entrant end; means for controlling the firing rate or capacity of said flame in accordance with the temperature of said work adjacent said exit end of said zone; means for continuously establishing a gas temperature for said entrant end of said zone corresponding to said firing rate of the flame; and means for controlling the length of said flame to obtain the established gas temperature for said entrant end of said zone.

21. A system as defined in claim 20 wherein said flame length controlling means includes means for measuring the temperature of said zone at said entrant end; means for comparing said measured temperature at said entrant end with said established temperature; and, means for (a) increasing said flame length if said measured temperature is less than said established temperature or (b) decreasing said flame length if said measured temperature is greater than said established temperature.

22. A system as defined in claim 21 including means for measuring the rate of change of said measured temperature at said entrant end as a function of time and means for decreasing the change of said flame length as a function of said measured rate.

23. A system as defined in claim 21 wherein said means for decreasing said length of said flame includes a summing means for subtracting a signal proportional to said rate of change from a signal for increasing or decreasing said length of said flame.

24. A method of heating a selected elongated zone in a multizone reheating furnace in response to parameters in the selected zone, said zone accepting work moving from an entrant end to an exit end at a variable throughput, said method comprising: sensing a temperature in the zone controlled by the current throughput rate in said zone; and, changing the heating profile between said entrant end and said exit end to change the effective length of said zone as a function of said current throughput rate.

25. A system of heating a selected elongated zone in a multizone reheating furnace in response to parameters in the selected zone, said zone accepting work moving from an entrant end to an exit end at a variable throughput, said system comprising: means for sensing a temperature in the zone controlled by the current throughput rate in said zone; and, means for changing the heating profile between said entrant end and said exit end to change the effective length of said zone as a function of said current throughput rate.

26. A system as defined in claim 25 wherein said sensed temperature is the temperature adjacent said entrant end of said zone.

* * * * *